(12) United States Patent
Mowatt et al.

(10) Patent No.: US 7,765,102 B2
(45) Date of Patent: *Jul. 27, 2010

(54) GENERIC SPELLING MNEMONICS

(75) Inventors: David Mowatt, Seattle, WA (US);
Robert Chambers, Sammamish, WA (US); Ciprian Chelba, Seattle, WA (US); Qiang Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/171,309

(22) Filed: Jul. 11, 2008

(65) Prior Publication Data

US 2008/0319749 A1    Dec. 25, 2008

Related U.S. Application Data

(63) Continuation of application No. 10/996,732, filed on Nov. 24, 2004, now Pat. No. 7,418,387.

(51) Int. Cl.
*G10L 15/00* (2006.01)
(52) U.S. Cl. .............................. 704/257; 704/9; 704/10
(58) Field of Classification Search ............... 704/9, 704/10, 1, 3, 251, 255, 254, 243, 257, 4, 704/6, 7
See application file for complete search history.

(56) References Cited

U.S. PATENT DOCUMENTS

| 6,321,196 | B1 | 11/2001 | Franceschi |
| 6,694,296 | B1 | 2/2004 | Alleva et al. |
| 7,315,811 | B2* | 1/2008 | Cote et al. ............... 704/9 |
| 7,315,815 | B1 | 1/2008 | Gersho et al. |
| 7,346,495 | B1* | 3/2008 | Zhao et al. ............... 704/10 |
| 2002/0184035 | A1 | 12/2002 | Hartley et al. |
| 2003/0167166 | A1 | 9/2003 | Mann |

OTHER PUBLICATIONS

EP Search Report, mailed Sep. 23, 2009, application No. EP 05109732.7, filed Oct. 19, 2005, pp. 1-4.
EP Extended Search Report, mailed Jan. 18, 2010, application No. EP 05109732.7, filed Oct. 19, 2005, pp. 1-9.

* cited by examiner

*Primary Examiner*—Huyen X. Vo

(57) ABSTRACT

A system and method for creating a mnemonics Language Model for use with a speech recognition software application, wherein the method includes generating an n-gram Language Model containing a predefined large body of characters, wherein the n-gram Language Model includes at least one character from the predefined large body of characters, constructing a new Language Model (LM) token for each of the at least one character, extracting pronunciations for each of the at least one character responsive to a predefined pronunciation dictionary to obtain a character pronunciation representation, creating at least one alternative pronunciation for each of the at least one character responsive to the character pronunciation representation to create an alternative pronunciation dictionary and compiling the n-gram Language Model for use with the speech recognition software application, wherein compiling the Language Model is responsive to the new Language Model token and the alternative pronunciation dictionary.

10 Claims, 4 Drawing Sheets

American English Phoneme Table

| SYM | Example | Phone ID |
|---|---|---|
| - | syllable boundary (hyphen) | 1 |
| ! | Sentence terminator (exclamation mark) | 2 |
| & | word boundary | 3 |
| , | Sentence terminator (comma) | 4 |
| . | Sentence terminator (period) | 5 |
| ? | Sentence terminator (question mark) | 6 |
| _ | Silence (underscore) | 7 |
| 1 | Primary stress | 8 |
| 2 | Secondary stress | 9 |
| aa | father | 10 |
| ae | cat | 11 |
| ah | cut | 12 |
| ao | dog | 13 |
| aw | foul | 14 |
| ax | ago | 15 |
| ay | bite | 16 |
| b | big | 17 |
| ch | chin | 18 |
| d | dig | 19 |
| dh | then | 20 |
| eh | pet | 21 |
| er | fur | 22 |
| ey | ate | 23 |
| f | fork | 24 |
| g | gut | 25 |
| h | help | 26 |
| ih | fill | 27 |
| iy | feel | 28 |
| jh | joy | 29 |
| k | cut | 30 |
| l | lid | 31 |
| m | mat | 32 |
| n | no | 33 |
| ng | sing | 34 |
| ow | go | 35 |
| oy | toy | 36 |
| p | put | 37 |
| r | red | 38 |
| s | sit | 39 |
| sh | she | 40 |
| t | talk | 41 |
| th | thin | 42 |
| uh | book | 43 |
| uw | too | 44 |
| v | vat | 45 |
| w | with | 46 |
| y | yard | 47 |
| z | zap | 48 |
| zh | pleasure | 49 |

Figure 4

GENERIC SPELLING MNEMONICS

CROSS-REFERENCE TO RELATED APPLICATIONS

This application claims priority to and is a continuation of U.S. patent application Ser. No. 10/996,732 entitled "Generic Spelling Mnemonics" and filed Nov. 24, 2004, now U.S. Pat. No. 7,418,387 which is incorporated herein by reference.

FIELD OF THE INVENTION

The present invention relates generally to voice recognition software applications and more particularly to a method for manipulating the characters of a phrase via a voice recognition application.

BACKGROUND OF THE INVENTION

Speech is perhaps the oldest form of human communication and many scientists now believe that the ability to communicate through speech is inherently provided in the biology of the human brain. Thus, it has been a long-sought goal to allow users to communicate with computers using a Natural User Interface (NUI), such as speech. In fact, recently great strides have been made in obtaining this goal. For example, some computers now include speech recognition applications that allow a user to verbally input both commands for operating the computer and dictation to be converted into text. These applications typically operate by periodically recording sound samples taken through a microphone, analyzing the samples to recognize the phonemes being spoken by the user and identifying the words made up by the spoken phonemes.

While speech recognition is becoming more commonplace, there are still some disadvantages to using conventional speech recognition applications that tend to frustrate the experienced user and alienate the novice user. One such disadvantage involves the interaction between the speaker and the computer. For example, with human interaction, people tend to control their speech based upon the reaction that they perceive in a listener. As such, during a conversation a listener may provide feedback by nodding or making vocal responses, such as "yes" or "uh-huh", to indicate that he or she understands what is being said to them. Additionally, if the listener does not understand what is being said to them, the listener may take on a quizzical expression, lean forward, or give other vocal or non-vocal cues. In response to this feedback, the speaker will typically change the way he or she is speaking and in some cases, the speaker may speak more slowly, more loudly, pause more frequently, or ever repeat a statement, usually without the listener even realizing that the speaker is changing the way they are interacting with the listener. Thus, feedback during a conversation is a very important element that informs the speaker as to whether or not they are being understood by the listener. Unfortunately however, conventional voice recognition applications are not yet able to provide this type of "Natural User Interface (NUI)" feedback response to speech inputs/commands facilitated by a man-machine interface.

Currently, voice recognition applications have achieved an accuracy rate of approximately 90% to 98%. This means that when a user dictates into a document using a typical voice recognition application their speech will be accurately recognized by the voice recognition application approximately 90% to 98% of the time. Thus, out of every one hundred (100) letters recorded by the voice recognition application, approximately two (2) to ten (10) letters will have to be corrected. In particular, existing voice recognition applications tend to have difficulty recognizing certain letters, such as "s" (e.g. ess) and "f" (e.g. eff). One approach existing voice recognition applications use to address this problem involves giving the user the ability to use predefined mnemonics to clarify which letter they are pronouncing. For example, a user has the ability to say "a as in apple" or "b as in boy" when dictating.

Unfortunately however, this approach has disadvantages associated with it that tends to limit the user friendliness of the voice recognition application. One disadvantage involves the use of the predefined mnemonics for each letter, which tend to be the standard military alphabet (e.g. alpha, bravo, charlie, . . . ). This is because that even though a user may be given a list of mnemonics to say when dictating, (e.g. "I as in igloo") they tend to form their own mnemonic alphabet (e.g. "I as in India") and ignore the predefined mnemonic alphabet. As can be expected, because the voice recognition applications do not recognize non-predefined mnemonics, letter recognition errors become commonplace. Another disadvantage involves the fact that while some letters have a small set of predominant mnemonics (i.e. >80%) associated with them (A as in Apple, A as in Adam or D as in Dog, D as in David or Z as in Zebra, Z as in Zulu), other letters have no predominant mnemonics associated with them (e.g. L, P, R and S). This makes the creation of a suitable generic language model not only very difficult, but virtually impossible. As such, communicating language to a speech recognition software application still produces a relatively high number of errors and not only do these errors tend to create frustration in frequent users, but they also tend to be discouraging to novice users as well, possibly resulting in the user refusing to continue employing the voice recognition application.

SUMMARY OF THE INVENTION

A method for creating a mnemonics Language Model for use with a speech recognition software application is provided, wherein the method includes generating an n-gram Language Model containing a predefined large body of characters, e.g. letters, numbers, symbols, etc., wherein the n-gram Language Model includes at least one character from the predefined large body of characters. The method further includes constructing a new Language Model (LM) token for each of the at least one character and extracting pronunciations for each of the at least one character responsive to a predefined pronunciation dictionary to obtain a character pronunciation representation. Additionally, the method includes creating at least one alternative pronunciation for each of the at least one character responsive to the character pronunciation representation to create an alternative pronunciation dictionary and compiling the n-gram Language Model for use with the speech recognition software application, wherein compiling the Language Model is responsive to the new Language Model token and the alternative pronunciation dictionary.

A method for creating a mnemonics Language Model for use with a speech recognition software application is provided, wherein the method includes generating an n-gram Language Model containing a predefined large body of characters, wherein the n-gram Language Model includes at least one character from the predefined large body of characters. Additionally, the method includes extracting pronunciations for each of the at least one character responsive to a predefined pronunciation dictionary to obtain a character pronunciation representation and creating at least one alternative pronunciation for each of the at least one character responsive to the character pronunciation representation to create an alternative pronunciation dictionary.

A system for implementing a method for creating a mnemonics Language Model for use with a speech recognition software application is provided, wherein the system includes a storage device for storing the Speech Recognition Software Application and at least one target software application. The system further includes an input device for vocally entering data and commands into the system, a display device, wherein the display device includes the display screen for displaying the entered data and a processing device. The processing device is communicated with the storage device, the input device and the display device, such that the processing device receives instructions to cause the Speech Recognition Software Application to display the spelling UI on the display screen and to manipulate the entered data responsive to the entered commands A machine-readable computer program code is provided, wherein the program code includes instructions for causing a processing device to implement a method for creating a mnemonics Language Model for use with a speech recognition software application, wherein the processing device is communicated with a storage device and a display device and wherein the storage device includes a Speech Recognition Software Application. The method includes generating an n-gram Language Model containing a predefined large body of characters, wherein the n-gram Language Model includes at least one character from the predefined large body of characters and constructing a new Language Model (LM) token for each of the at least one character. The method further includes extracting pronunciations for each of the at least one character responsive to a predefined pronunciation dictionary to obtain a character pronunciation representation and creating at least one alternative pronunciation for each of the at least one character responsive to the character pronunciation representation to create an alternative pronunciation dictionary. Moreover, the method includes compiling the n-gram Language Model for use with the speech recognition software application, wherein compiling the Language Model is responsive to the new Language Model token and the alternative pronunciation dictionary.

A medium encoded with a machine-readable computer program code is provided, wherein the program code includes instructions for causing a processing device to implement a method for creating a mnemonics Language Model for use with a speech recognition software application, wherein the processing device is communicated with a storage device and a display device and wherein the storage device includes a Speech Recognition Software Application. The method includes generating an n-gram Language Model containing a predefined large body of characters, wherein the n-gram Language Model includes at least one character from the predefined large body of characters and constructing a new Language Model (LM) token for each of the at least one character. The method further includes extracting pronunciations for each of the at least one character responsive to a predefined pronunciation dictionary to obtain a character pronunciation representation and creating at least one alternative pronunciation for each of the at least one character responsive to the character pronunciation representation to create an alternative pronunciation dictionary. Moreover, the method includes compiling the n-gram Language Model for use with the speech recognition software application, wherein compiling the Language Model is responsive to the new Language Model token and the alternative pronunciation dictionary.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures:

FIG. 4 is a table of American English Phonemes.

DETAILED DESCRIPTION OF THE INVENTION

Most speech recognition applications employ a model of typical acoustic patterns and of typical word patterns in order to determine a word-by-word transcript of a given acoustic utterance. These word-patterns are then used by speech recognition applications and are collectively referred to as Language Models (LM). As such, a Language Model represents word sequences and the probability of that sequence occurring in a given context. Thus, in order to be effective in speech recognition applications, a Language Model must be constructed from a large amount of textual training data. It should also be appreciated that mnemonics may be used to great effect when used to correct the spelling of a word using a desktop speech recognition software application. For example, one scenario may involve a user attempting to spell a word without using mnemonics and is now in the situation where the speech recognition software application has misrecognized one (or more) of the letters that were communicated. Using mnemonics to re-speak a letter dramatically increases the likelihood of the user being successful when re-speaking that letter.

Figure 1:
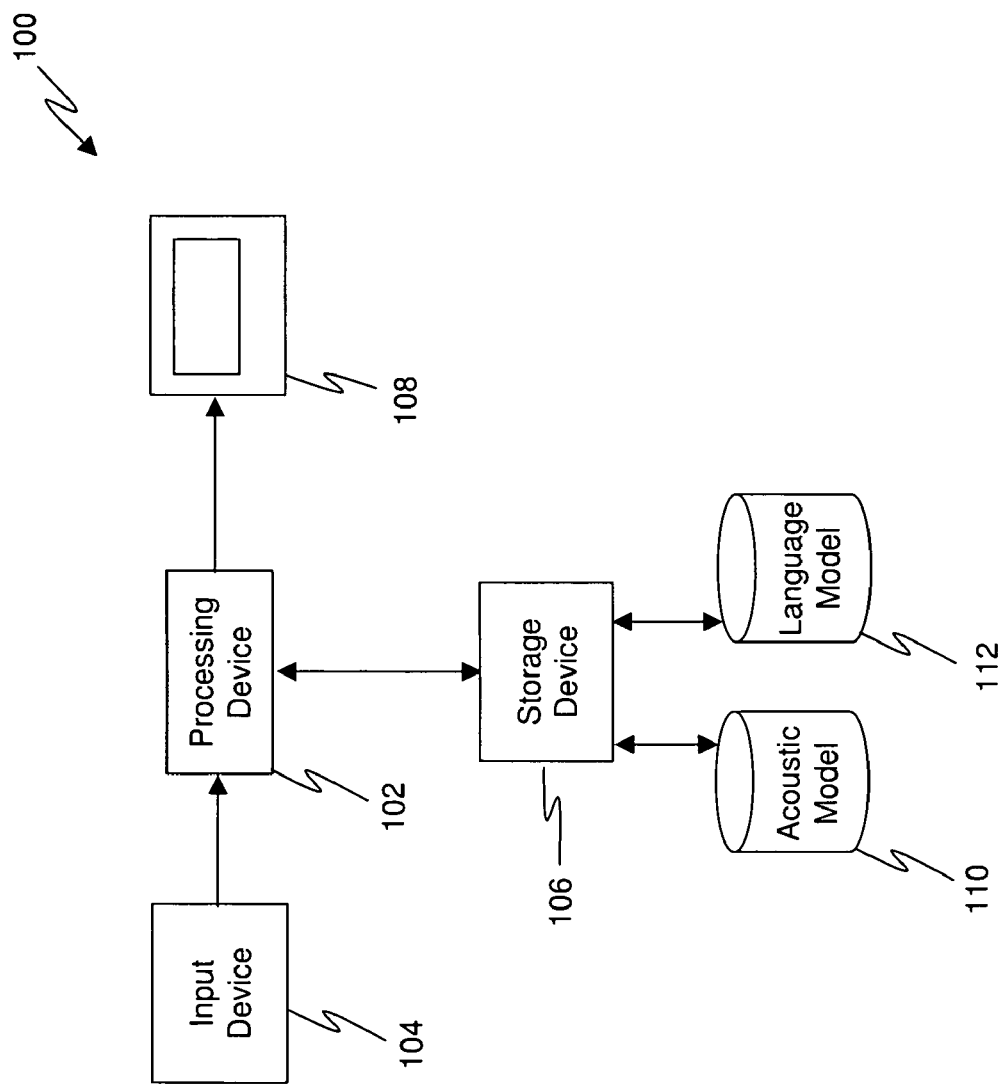
FIG. 1 is a block diagram illustrating a typical speech recognition system.

Referring to FIG. 1, a block diagram illustrating a typical speech recognition system 100 is shown and includes a processing device 102, an input device 104, a storage device 106 and a display device 108, wherein an acoustic model 110 and a Language Model 112 are stored on storage device 106. The acoustic model 110 typically contains information that helps the decoder determine what words have been spoken. The acoustic model 110 accomplishes this by hypothesizing a series of phonemes based upon the spectral parameters provided by the input device 104, wherein a phoneme is the smallest phonetic unit in a language that is capable of conveying a distinction in meaning and typically involves the use of a dictionary and hidden Markov models. For example, the acoustic model 110 may include a dictionary (lexicon) of words and their corresponding phonetic pronunciations, wherein these pronunciations contain an indicator of the probability that a given phoneme sequence will occur together to form a word. Additionally, the acoustic model 110 may also include information regarding the likelihood of distinct phonemes possibly occurring in the context of other phonemes. For example, a "tri-phone" is a distinct phoneme used in the context of one distinct phoneme on the left (prepending) and another distinct phoneme on the right (appending). Thus, the contents of the acoustic model 110 are used by the processing device 102 to predict what words are represented by the computed spectral parameters.

Additionally, the Language Model (LM) 112 specifies how, and in what frequencies, words will occur together. For example, an n-gram Language Model 112 estimates the probability that a word will follow a sequence of words. These probability values collectively form the n-gram Language Model 112. The processing device 102 then uses the probabilities from the n-gram Language Model 112 to choose among the best word-sequence hypotheses, as identified using the acoustic model 110, to obtain the most likely word or word sequence represented by the spectral parameters, wherein the most likely hypotheses may be displayed by the display device 108.

The present invention as described herein is described in the context of a standalone and/or integrated application module used with a general purpose computer implemented system which uses a speech recognition application to receive and recognize voice commands entered by a user. As an object-oriented application, the application module may expose a standard interface that client programs may access to communicate with the application module. The application module may also permit a number of different client programs, such as a word processing program, a desktop publishing program, an application program, and so forth, to use the application module locally and/or over a network, such as a WAN, a LAN and/or an internet based vehicle. For example, the application module may be access and used with any application and/or control having a text field, such as an email application or Microsoft® Word, locally or via an Internet access point. However, before describing aspects of the present invention, one embodiment of a suitable computing environment that can incorporate and benefit from this invention is described below.

Figure 2:
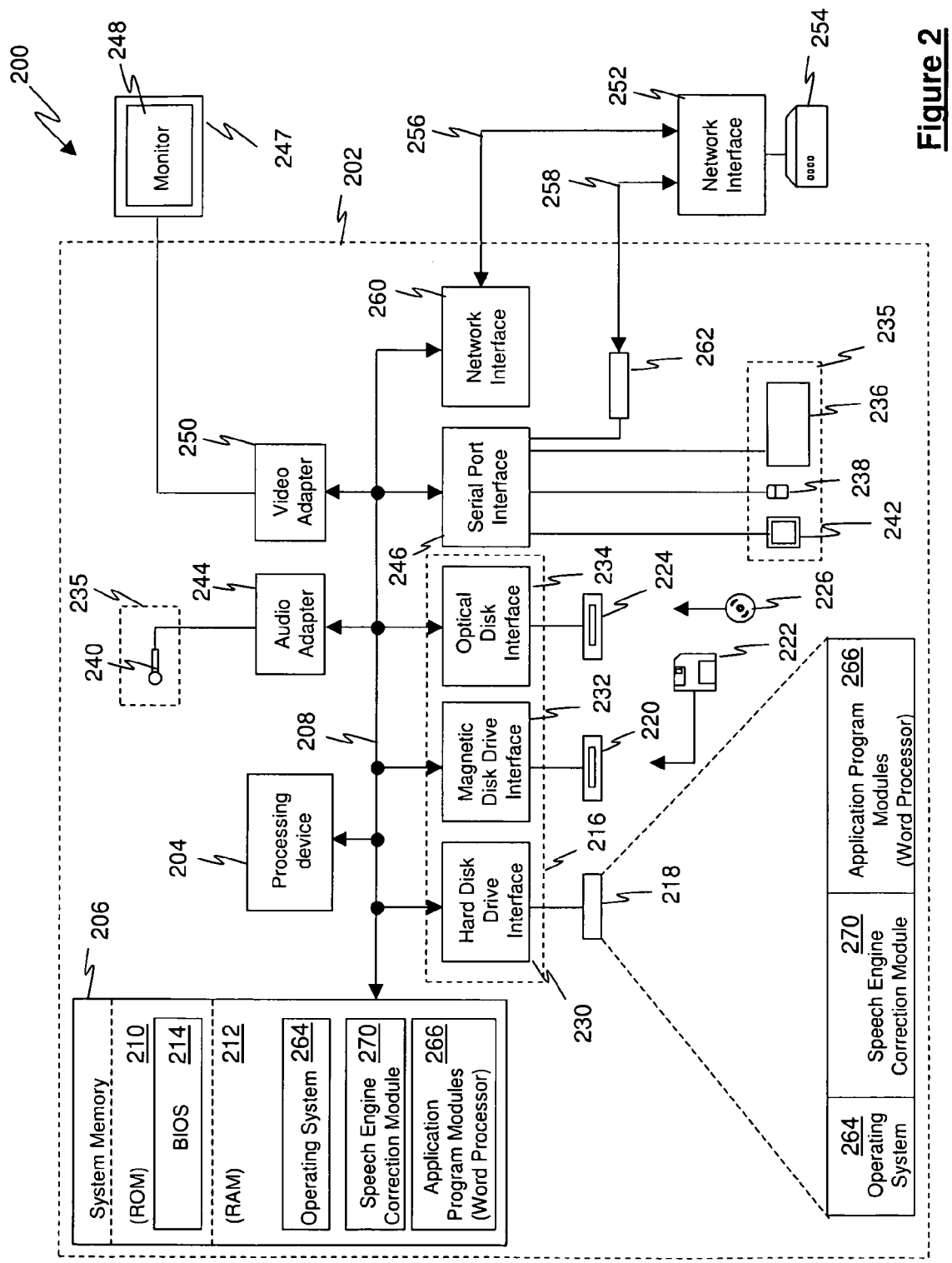
FIG. 2 is a schematic block diagram illustrating a system for implementing a method for creating a mnemonics language model for use with a speech recognition software application, in accordance with an exemplary embodiment.

Referring to FIG. 2, a block diagram illustrating a system 200 for implementing a method for creating a mnemonic Language Model 112 for use with a speech recognition software application is shown and includes a general computer system 202, including a processing device 204, a system memory 206, and a system bus 208, wherein the system bus 208 couples the system memory 206 to the processing device 204. The system memory 206 may include read only memory (ROM) 210 and random access memory (RAM) 212. A basic input/output system 214 (BIOS), containing basic routines that help to transfer information between elements within the general computer system 202, such as during start-up, is stored in ROM 210. The general computer system 202 further includes a storage device 216, such as a hard disk drive 218, a magnetic disk drive 220, e.g., to read from or write to a removable magnetic disk 222, and an optical disk drive 224, e.g., for reading a CD-ROM disk 226 or to read from or write to other optical media. The storage device 216 may be connected to the system bus 208 by a storage device interface, such as a hard disk drive interface 230, a magnetic disk drive interface 232 and an optical drive interface 234. The drives and their associated computer-readable media provide non-volatile storage for the general computer system 202. Although the description of computer-readable media above refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, Bernoulli cartridges, and the like.

A user may enter commands and information into the general computer system 202 through a conventional input device 235, including a keyboard 236, a pointing device, such as a mouse 238 and a microphone 240, wherein the microphone 240 may be used to enter audio input, such as speech, into the general computer system 202. Additionally, a user may enter graphical information, such as a drawing or hand writing, into the general computer system 202 by drawing the graphical information on a writing tablet 242 using a stylus. The general computer system 202 may also include additional input devices suitable to the desired end purpose, such as a joystick, game pad, satellite dish, scanner, or the like. The microphone 240 may be connected to the processing device 204 through an audio adapter 244 that is coupled to the system bus 208. Moreover, the other input devices are often connected to the processing device 204 through a serial port interface 246 that is coupled to the system bus 208, but may also be connected by other interfaces, such as a parallel port interface, a game port or a universal serial bus (USB).

A display device 247, such as a monitor or other type of display device 247, having a display screen 248, is also connected to the system bus 208 via an interface, such as a video adapter 250. In addition to the display screen 248, the general computer system 202 may also typically include other peripheral output devices, such as speakers and/or printers. The general computer system 202 may operate in a networked environment using logical connections to one or more remote computer systems 252. The remote computer system 252 may be a server, a router, a peer device or other common network node, and may include any or all of the elements described relative to the general computer system 202, although only a remote memory storage device 254 has been illustrated in FIG. 2. The logical connections as shown in FIG. 2 include a local area network (LAN) 256 and a wide area network (WAN) 258. Such networking environments are commonplace in offices, enterprise-wide computer networks, intranets and the Internet.

When used in a LAN networking environment, the general computer system 202 is connected to the LAN 256 through a network interface 260. When used in a WAN networking environment, the general computer system 202 typically includes a modem 262 or other means for establishing communications over a WAN 258, such as the Internet. The modem 262, which may be internal or external, may be connected to the system bus 208 via the serial port interface 246. In a networked environment, program modules depicted relative to the general computer system 202, or portions thereof, may be stored in the remote memory storage device 254. It should be appreciated that the network connections shown are exemplary and other means of establishing a communications link between the computer systems may be used. It should also be appreciated that the application module could equivalently be implemented on host or server computer systems other than general computer systems, and could equivalently be transmitted to the host computer system by means other than a CD-ROM, for example, by way of the network connection interface 260.

Figure 3:
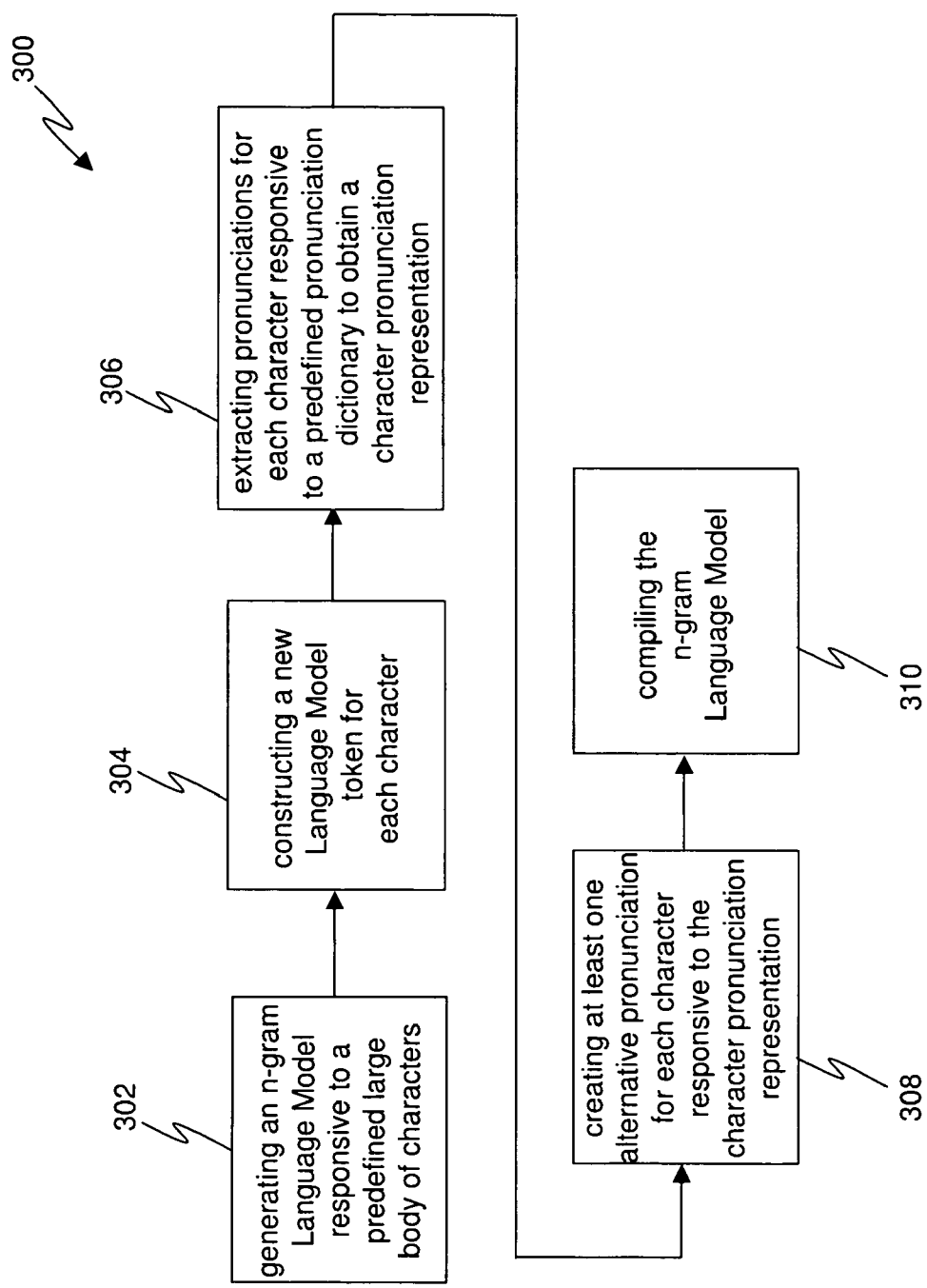
FIG. 3 is a block diagram illustrating a method for creating a mnemonics language model for use with a speech recognition software application, in accordance with an exemplary embodiment.

Furthermore, a number of program modules may be stored in the drives and RAM 212 of the general computer system 202. Program modules control how the general computer system 202 functions and interacts with the user, with I/O devices or with other computers. Program modules include routines, operating systems 264, target application program modules 266, data structures, browsers, and other software or firmware components. The method of the present invention may be included in an application module and the application module may conveniently be implemented in one or more program modules, such as a speech engine correction module 270 based upon the methods described herein. The target application program modules 266 may comprise a variety of applications used in conjunction with the present invention, some of which are shown in FIG. 3. The purposes of and interactions between some of these program modules are discussed more fully in the text describing FIG. 3. These include any application and/or control having a text field, e.g. an email application, a word processor program (such as Microsoft® Word, produced by Microsoft Corporation of Redmond, Wash.), a handwriting recognition program module, the speech engine correction module 270, and an input method editor (IME).

It should be appreciated that no particular programming language is described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems that may be used in practicing an exemplary embodiment, and therefore no detailed computer program could be provided which would be applicable to all of these many different systems. Each user of a particular computer will be aware of the language and tools which are most useful for that user's needs and purposes.

Referring to FIG. 3, a block diagram illustrating a method 300 for creating a mnemonics language model for use with a speech recognition software application implemented using the general computer system 202 of FIG. 2, is shown wherein the general computer system 202 includes a processing device 204 communicated with an input device 235, a storage device 216 and a display device 247, wherein the display device 247 includes the display screen 248, as shown in FIG. 2. As discussed above, the input device 235 may be any device suitable to the desired end purpose, such as a microphone. Furthermore, the speech recognition software application may be stored on the storage device 216 to allow the processing device 204 to access the speech recognition software application. Moreover, at least one target software application 266, such as Microsoft® Windows, may also be stored on the storage device 216 to allow a user to implement the target software application via an instruction communicated to the processing device 204.

The method 300 includes generating an n-gram Language Model 112 for each character and/or character string in a predefined large body of characters and/or character strings, as shown in operational block 302. As briefly discussed above, this would assign a probability to the occurrence of a specific character following other characters. For example, consider the occurrence of the letter "a" after the character string "er" in the word "era." Generating an n-gram Language Model 112 would cause a probability, P(a|e,r), to be assigned to this occurrence. In other word, the probability P(a|e,r) would represent the likelihood of the a occurring after the letter sequence "er." It should be appreciated that the n-gram Language Model 112 may be written as a file in the community standard ARPA format and may be case sensitive to allow for the assignment of probabilities to both the upper case and the lower case letters. The method 300 also includes constructing a new Language Model token for each of the characters and/or character strings in the predefined large body of characters and/or character strings, as shown in operational block 304. For example, consider the character "a", wherein a Language Model token already exists. A new Language Model token, "a-AsIn", is constructed for use with mnemonics spelling, while the old Language Model token, "a", is retained for use with character spelling. This allows for an n-gram Language Model 112 to be constructed for regular spelling techniques and mnemonic spelling techniques while maintaining performance and without increasing the size of the Language Model.

The method 300 further includes extracting pronunciations for each of the characters and/or character strings responsive to a predefined pronunciation dictionary for the speech recognition software application to create an alternative pronunciation dictionary of character pronunciation representations, as shown in operational block 306. For example, again consider the character "a", wherein the pronunciations for words starting in "a" are extracted from the pronunciation dictionary of the speech recognition software application being used for desktop dictation. Using this dictionary, the word "ARON" is found to have a character pronunciation representation of "ae r ax n" as shown in FIG. 4. For each of the characters and/or character strings in the predefined pronunciation dictionary, an alternative pronunciation may be created by prepending each character with its new Language Model token and by appending a long silence "sil", as shown in operational block 308. For example, consider the new Language Model token "a AsIn" and the word "ARON." Given the above relationship the pronunciation alternative would be represented by "ey AA1 ey ae z ih n ae r ax n sil", wherein "ey AA1 ey ae z ih n" is the prepended pronunciation for "a AsIn", "ae r ax n" is the pronunciation for "ARON" and "sil" is the appended long silence. Additionally, capital letters are treated in a similar manner. For example, consider the phrase "capital a as in ARON." Given the above relationship, the pronunciation alternative would be represented by "k ae p ih t ax 1 ey AA1 ey ae z ih n ae r ax n sil", wherein "k ae p ih t ax 1" is the pronunciation for capital, "ey AA1 ey ae z ih n" is the prepended pronunciation for "a AsIn", "ae r ax n" is the pronunciation for "ARON" and "sil" is the appended long silence.

The n-gram Language Model for use in the large vocabulary recognizer may then be compiled using a standard compiler, as shown in operational block 310, wherein the input to the compiler includes the n-gram Language Model (in ARPA format) built in operation block 302 and the pronunciation dictionary (which encodes the different pronunciations variants for each letter) built in operational block 304 and operational block 306. It should be appreciated that the n-gram Language Model 112 may be compiled using any compiling device suitable to the desired end product, such as a Just-In-Time (JIT) compiler.

It should be appreciated that the method 300 facilitates the creation of a trigram based speech language model that gives a user the ability to use a language model having more than 120,000 nm emonics. This may be accomplished by encoding the fact that a user can say one of 120,000 words, encoding the pronunciation of the words and encoding the trigram probabilities of one word appearing given two previous words of context. For example, given the phrase "this is", and the next word the user spoke could be the word "near" or "kneel", then because the phrase "this is near" is much more common in English than "this is kneel", the word "kneel" is chosen. In a similar fashion, for the spelling language model, the term "word" actually refers to characters, wherein the characters include the twenty-six lower case letters, the twenty-six upper case letters, numbers and symbols. Thus, the method 300 disclosed herein uses an average of 5000 pronunciations per letter (S as in Salmon=S, S as in Sugar=S, S as in Salamander=S . . . ) and in fact, every word in the 120,000 word dictation model is used as a possible mnemonic. Each mnemonic is assigned a different weight for each letter or pronunciation, some being given more weight than others. For example, the mnemonic phase "T as in Tom" is given more weight than "T as in tertiary" because of the probability that the mnemonic phase "T as in Tom" has been used more frequently. Additionally, mnemonic sequences also have probabilities, for example, the likelihood that "D" as in Donkey is followed by "F" as in Fun is less than the likelihood that "D" as in Donkey is followed by "S" as in Sun. These probabilities may be generated specially or they may be obtained from a simple list of mnemonics as sampled by surveys. It should also be appreciated that the method 300 as disclosed herein allows for the system 200 to 'learn' additional characters and/or character strings. Moreover, although method 300 is disclosed and discussed herein with regard to American English Phoneme, method 300 may be used with phonemes for any language, such as Chinese, Russian, Spanish and French.

In accordance with an exemplary embodiment, the processing of FIG. 3 may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for creating a mnemonic pronunciation of a character for computer-recognition of the character, the method comprising:
   using a processing device, selecting the character to be recognized;
   using the processing device, selecting a word that begins with the character; and
   using the processing device, constructing a mnemonic pronunciation representing the character including a pronunciation representing the character, a pronunciation representing a term meaning "as in", and a pronunciation of the word.

2. The method of claim 1, wherein the character is a lower case letter, upper case letter, number, or symbol.

3. The method of claim 1, wherein, if the character is an upper case character, the constructing a mnemonic pronunciation further includes prepending a representation of a term meaning "capital" to the mnemonic pronunciation.

4. The method of claim 1, wherein computer-executable instructions for carrying out the method are embodied on a computer-readable medium.

5. The method of claim 1, further comprising compiling the mnemonic representation.

6. The method of claim 1, wherein the character is selected from a character string.

7. The method of claim 1, wherein the word is selected from a dictionary.

8. The method of claim 1, wherein the constructing a mnemonic pronunciation further includes appending a representation of a long silence to the pronunciation of the word.

9. The method of claim 1, wherein the word is based on the English language.

10. The method of claim 1, wherein the word based on at least one of Chinese, Russian, Spanish or French language.

* * * * *